Jan. 28, 1958     E. G. VASCONI ET AL     2,821,010
BEARING SLEEVE
Filed March 17, 1955
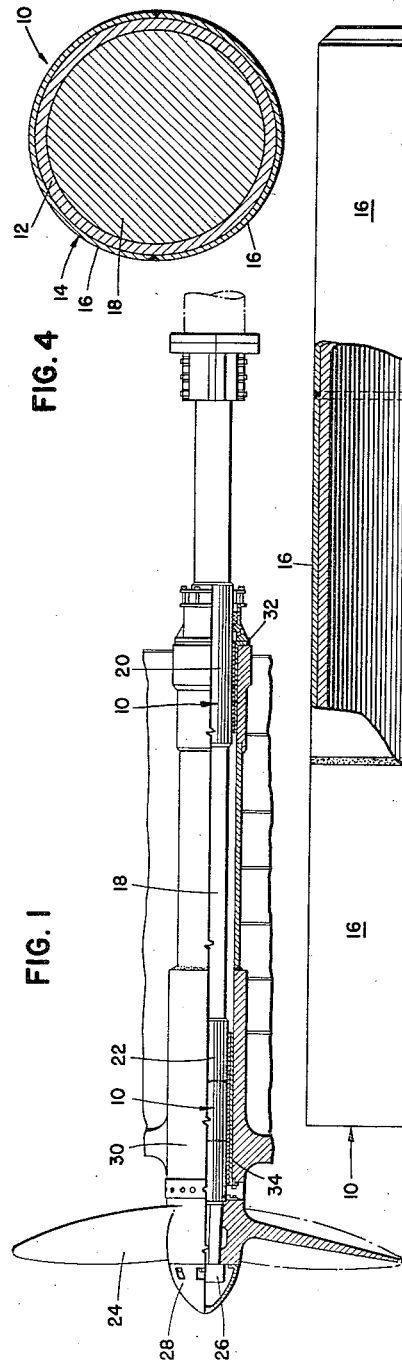
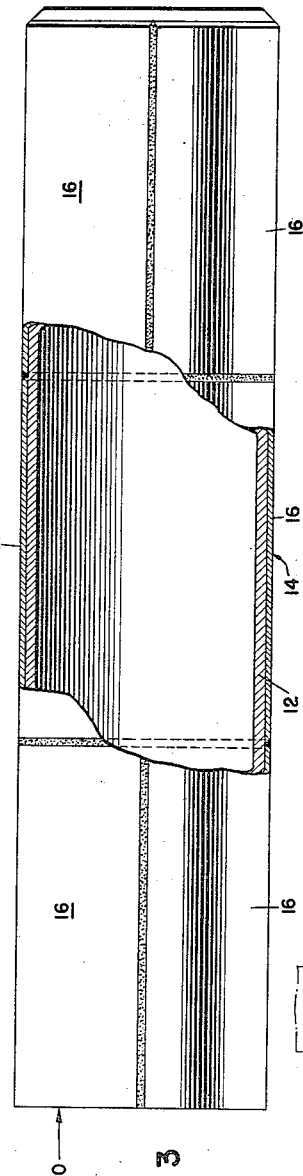
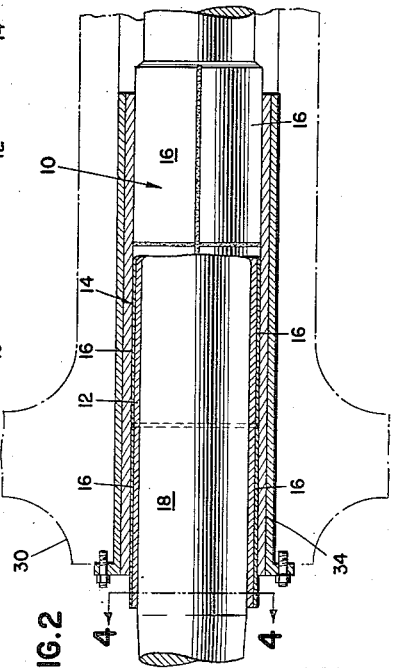
INVENTOR
EDGARDO G. VASCONI
HAROLD J. MEEK
BY *Alvin Browdy*
ATTORNEY

United States Patent Office 2,821,010
Patented Jan. 28, 1958

2,821,010

BEARING SLEEVE

Edgardo G. Vasconi, Fairview, N. J., and Harold J. Meek, Staten Island, N. Y., assignors, by direct and mesne assignments, to Jaroco Engineering Co., Hoboken, N. J., a corporation of New Jersey Application March 17, 1955, Serial No. 495,008

4 Claims. (Cl. 29—149.5)

The present invention relates to improvements in bearings, and more particularly to an arrangement for bearings and method of making, utilizing a hard bearing surface material which is substantially harder than the material to which it is attached.

Heretofore it has been proposed to produce an extra-long wearing bearing surface on a shaft by welding a sleeve of a hard material directly onto the shaft. The resulting shaft is usually distorted by the welding and requires re-machining of the entire shaft. This is a costly operation and the present invention eliminates this problem.

It is therefore an object of the present invention to provide a method of attaching a hard bearing surface to a shaft without distorting the shaft.

It is a further object of the present invention to provide a novel bi-metal sleeve which can be attached to a shaft to provide an outer hard bearing surface thereon.

It is a still further object of the present invention to provide a method of forming a bi-metal sleeve suitable for attachment to a shaft to provide an outer hard bearing surface thereon.

Other objects and the nature and advantages of the instant invention will be apparent from the following description taken in conjunction with the accompanying drawings, wherein:

Fig. 1 is a fragmentary elevational view partly in section of a tail shaft in a marine application provided with an inboard and outboard bearing in accordance with the present invention;

Fig. 2 is an enlarged detail view of a portion of Fig. 1 showing the outboard bearing in more detail;

Fig. 3 is an elevational view partly in section of the bi-metal sleeve ready for mounting on the shaft;

Fig. 4 is a sectional view along the line 4—4 of Fig. 2; and

Fig. 5 is a perspective view of a section of a half sleeve of the bearing.

Referring to the drawings, the bi-metal sleeve 10 is best shown in Fig. 3. This sleeve is made up of an inner metallic sleeve 12 which may be made of steel. Onto this inner sleeve 12 is welded an outer sleeve or facing 14 of a harder metal which is suitable for use as a bearing surface. As illustrated in Fig. 3, the outer facing 14 may be made up from a plurality of half sleeves 16, shown in Fig. 4, which are welded together longitudinally in pairs onto the inner sleeve 12 and then circumferentially to securely attach the outer hard facing onto the inner sleeve. The bi-metal sleeves so formed are then machined and finished to fit the desired diameter of rotatable shaft.

The bi-metal sleeve can be installed on a rotatable shaft 18 by the shrink method, thereby eliminating any distortion of the shaft resulting from welding. The shaft with the hard facing securely attached thereto is ready for use. The hard facing 14 prevents excessive shaft wear.

This method of facing shafts with a hard outer surface using the bi-metal sleeve has many applications to a vast variety of rotatable or reciprocable shafts in industry. The bi-metal sleeve may be installed by other means than the shrink method, such as by pressing, keying or even welding as the application requires.

A typical application for use of this bearing is shown in Figs. 1 and 2, wherein a pair of bi-metal sleeves 10 are shown attached to a propeller shaft 18 to provide an inboard bearing 20 and an outboard bearing 22. The propeller 24 is shown attached to the end of the shaft 18 in the conventional manner by a propeller nut 26 and cap 28. Attached to the stern tube 30 adjacent each bearing is a split bushing 32, 34 adapted to fit over the bi-metal sleeves and form mating bearing surfaces.

The hard outer facing 14 on the bi-metal sleeve 10 may be any hard metal or alloy which is suitable for use as a bearing surface. Particularly suitable are the cobalt base alloys which are noted for their hardness, strength and wear resistance. These alloys contain steel, cobalt, chromium, tungsten and nickel. Other metals and alloys may be used as the outer facing, such as chrome, nickel, stainless steels and the like, depending upon the service conditions to be met.

The cobalt base alloys are particularly advantageous due to their ability to withstand the corrosive attack of many chemicals; they have a very low frictional coefficient and will take and keep a high polish.

The use of this method of preparing bearing surfaces for shafts results in the extension of the production life of worn shafts and bearing blocks, as well as producing extra long wearing surfaces in new equipment. These cobalt base alloy facings give outstanding service when used where efficient lubrication is impossible, or where lubricants become diluted or decompose under heat. They are extremely resistant to seizing and galling.

It will be obvious to those skilled in the art that various changes may be made without departing from the spirit of the invention and therefore the invention is not limited to what is shown in the drawings and described in the specification but only as indicated in the appended claims.

What is claimed is:

1. The method of making a bearing member which consists in welding an outer hard metal facing to an inner metal sleeve to form a bi-metal sleeve, and then attaching said bi-metal sleeve to a shaft.

2. The method in accordance with claim 1, wherein said outer hard metal facing is formed by welding a plurality of half sleeves together and to said inner metal sleeve.

3. The method in accordance with claim 1, wherein said bi-metal sleeve is machined and finished to fit said shaft, and then shrink-fitting said bi-metal sleeve onto said shaft.

4. The method in accordance with claim 2, wherein said bi-metal sleeve is machined and finished to fit said shaft, and then shrink-fitting said bi-metal sleeve onto said shaft.

References Cited in the file of this patent

UNITED STATES PATENTS

| | | |
|---|---|---|
| 2,072,001 | Guthans | Feb. 23, 1937 |
| 2,086,681 | Scott | July 13, 1937 |
| 2,301,495 | Abegg | Nov. 10, 1942 |
| 2,590,761 | Edgar | Mar. 25, 1952 |

FOREIGN PATENTS

| | | |
|---|---|---|
| 823,079 | Germany | Nov. 29, 1951 |